United States Patent Office 3,322,828
Patented May 30, 1967

3,322,828
TRIFLUOROMETHYL-SULPHONIC ACID-TRI-FLUOROMETHYLPHENYL AMIDES AND PROCESS FOR THEIR PRODUCTION
Friedrich Muth, Leverkusen-Bayerwerk, Günter Unterstenhöfer, Opladen, and Heinz Herlinger, Cologne-Flittard, Germany, assignors to Farbenfabriken Bayer Aktiengesellschaft, Leverkusen, Germany, a corporation of Germany
No Drawing. Filed Nov. 22, 1963, Ser. No. 325,765
Claims priority, application Germany, Dec. 17, 1962,
F 38,576
4 Claims. (Cl. 260—556)

The present invention is concerned with novel trifluoromethylphenyl-sulphonic acid-trifluoromethylphenyl amides which show acaricidal properties, and with a process for their production.

It has already become known that trifluoromethylphenyl-sulphonic acid-trifluoromethylphenyl amides which contain further substituents, preferably halogen, possess insecticidal properties (cf. Belgian Patent Specification No. 581,914).

It has been found that trifluoromethylphenyl-sulphonic acid-trifluoromethylphenyl amides of the formula $(CF_3)_n$—⟨⟩—$SO_2NH$—⟨⟩—$(CF_3)_n$ (I)

wherein $n$ stands for a whole number from 1–3, show strong acaricidal properties.

In Formula I, $n$ means preferably 1 or 2. Especially effective are those compounds which contain at least a total of three trifluoromethyl groups.

It has also been found that trifluoromethylphenyl-sulphonic acid-trifluoromethylphenyl amides of the Formula I are obtained by reacting trifluoromethylphenyl-sulphonic acid halides of the formula $(CF_3)_n$—⟨⟩—$SO_2Hal$ (II)

wherein $n$ stands for 1, 2 or 3 and Hal for halogen, especially chlorine, possibly in the presence of bases, with trifluoromethyl anilides of the general formula $H_2N$—⟨⟩—$(CF_{3n})$ (III)

wherein $n$ stands for 1, 2 or 3. The reaction is expediently carried out in the presence of a diluent.

It is definitely surprising that the compounds according to the invention which contain exclusively trifluoromethyl groups, but no halogen atoms, as substituents have a subtsantially higher effectiveness than the compounds known from the state of the art which contain trifluoromethyl groups as well as halogen atoms. Furthermore, it must be called definitely surprising that the compounds according to the present invention, in contradistinction to the most closely related known compounds, are considerably less phytotoxic in spite of their increased acaricidal effectiveness. This fact renders them especially valuable for combating spider mites. The new products according to the invention represent a substantial enrichment of the art.

If the reaction according to the invention is started from 3,5-bis-trifluoromethylbenzene sulphochloride and 3,5-bis-trifluoromethyl aniline, the course of the reaction can be illustrated by the following scheme of formulae:

$F_3C$—⟨⟩—$SO_2Cl$ + $H_2N$—⟨⟩—$CF_3$  $\xrightarrow{\text{Base}}$
     $F_3C$                    $CF_3$ $F_3C$—⟨⟩—$SO_2$—$NH$—⟨⟩—$CF_3$
     $F_3C$                    $CF_3$ (IV)

The benzene sulphohalides to be considered for the process according to the invention are unequivocally characterised by the Formula II given above. The trifluoromethyl groups may stand in the ortho- as well as in the meta- or para-position.

As individual examples of sulphochlorides, there may be mentioned: 3-trifluoromethylbenzene sulphochloride, 3,5-bis-trifluoromethylbenzene sulphochloride, 4-trifluoromethylbenzene sulphochloride and 2,4,6-tris-trifluoromethylbenzene sulphochloride.

The anilines to be used according to the invention are exactly defined by the above Formula II. Here also, the trifluoromethyl groups may stand in ortho-, meta- or para-position.

Individual examples are: 3-trifluoromethyl aniline, 4-trifluoromethyl aniline, 3,5-bis-trifluoromethyl aniline and 2,4,6-tris-trifluoromethyl aniline.

Suitable diluents for the process according to the invention are all inert organic solvents as well as water. In particular, the following may be mentioned: pyridine, dichlorobenzene, dioxan, acetonitrile and dimethyl formamide.

The reaction according to the invention can be carried out with the use of acid-binding agents. This is, however, not absolutely necessary. Suitable acid-binding agents are those usually employed, for example pyridine, triethylamine and potassium carbonate.

The reaction according to the invention can be carried out in a wide range of temperatures. In general, the operation takes place between 0 and 180° C., preferably between 0 and 80° C.

In carrying out the process according to the invention, the reaction components are applied in equimolecular quantities. It may, however, also be expedient to use an excess of trifluoromethyl aniline. An especially advantageous method consists in starting with the amine component, optionally together with a diluent, and adding the sulphohalide in portions.

Working up of the reaction mixture is carried out in the customary manner.

The compounds according to the invention exhibit strong acaricidal and ovicidal properties. They can be employed against normally sensitive, as well as resistant spider mites at any stage of development. It must be especially emphasized that the substances according to the invention exhibit only a low phytotoxicity.

The substances according to the invention can be used as such or formulated in the customary manner. Preferred formulations are aqueous emulsions and dispersions, but also dusts may be used. The formulations are prepared with the use of conventional emulsifiers, dispersing agents and extenders.

In the following table, the acaricidal action of two of the compounds according to the invention is shown and compared with the most closely related known derivative.

The tests were carried out in customary manner. The emulsions were prepared by dissolving one part of the agent in four parts of dimethyl-formamide and diluting the concentrated solution to the desired concentrations with water and the use of emulsifier.

TABLE

| | Tetranychus telarius | | | |
|---|---|---|---|---|
| | Normally sensitive | | Resistant | |
| | Concentration in percent (agent/water) | Destroyed in percent | Concentration in percent (agent/water) | Destroyed in percent |
| 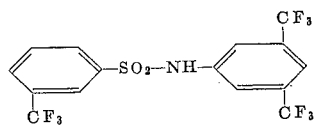 | 0.05<br>0.02<br>0.01 | 100<br>90<br>50 | 0.05<br>0.02<br>0.01 | 100<br>80<br>30 |
| 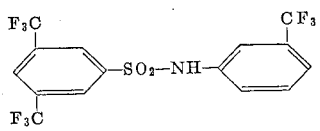 | 0.05<br>0.02 | 90<br>80 | 0.05<br>0.02 | 100<br>70 |
| (previously known) | -------- | -------- | 0.05<br>0.02 | 100<br>0 |

The superiority of the products according to the invention is shown by the table. Whereas the compounds according to the invention do not damage the plants, for example bean plants, considerable damage occurred by the known compounds.

The following examples are given for the purpose of illustrating the present invention.

Example 1

245 g. of 3-trifluoromethylbenzene sulphochloride are added portionwise at 0–5° C. in the course of 1–2 hours to a solution of 228 g. of 3,5-bis-trifluoromethyl aniline in 1 litre of pyridine, and the mixture is stirred, after warming to room temperature, for 8 hours. It is finally heated at 60° C. for 1 hour and the reaction mixture poured, after cooling, on 2 kg. of ice in 2 litres of 20% hydrochloric acid. An oil thereby precipitates which solidifies, after residual traces of unreacted 3,5-bis-trifluoromethyl aniline have been distilled off with steam. The 3-trifluoromethylbenzene - 3',5' - bis - trifluoromethylbenzene sulphonamide can be purified by taking up in aqueous sodium hydroxide and precipitation with aqueous hydrochloric acid. A product of melting point 112° C. is obtained from recrystallisation from alcohol or ligroin.

Example 2

In an analogous manner, the 3,5-bis-trifluoromethylbenzene-3'-trifluoromethylbenzene sulphonamide is prepared from 3,5-bis-trifluoromethylbenzene sulphochloride and 3-trifluoromethyl aniline. Melting point: 108° C. (recrystallised from ligroin).

Example 3

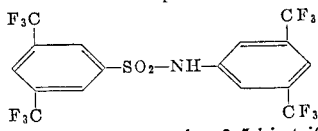

In an analogous manner, the 3,5-bis-trifluoromethylbenzene-3',5'-bis-trifluoromethylbenzene sulphonamide is obtained from 3,5-bis-trifluoromethylbenzene sulphochloride and 3,5-bis-trifluoromethyl aniline. Melting point: 113–114° C. (recrystallisation from alcohol).

We claim:

1. A compound of the formula

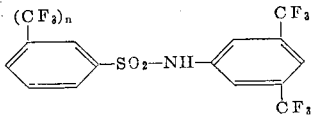

wherein $n$ is a whole number of 1–3, the sum of the trifluoromethyl substituents being at least a total of 3.

2. The compound of claim 1 wherein $n$ is 2.

3. A compound of the formula

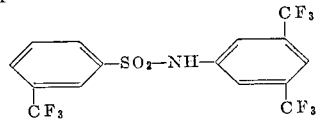

4. A compound of the formula

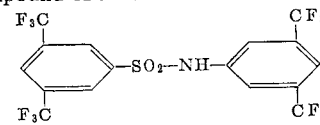

References Cited

UNITED STATES PATENTS

| 2,618,538 | 11/1952 | Gilbert | 167—30 |
| 3,034,955 | 5/1962 | Frick et al. | 260—556 X |
| 3,162,684 | 12/1964 | Frick et al. | 260—556 |

FOREIGN PATENTS

| 216,493 | 7/1961 | Austria. |
| 900,111 | 7/1962 | Great Britain. |

JOHN D. RANDOLPH, *Primary Examiner.*